(12) United States Patent
Ohtsukasa

(10) Patent No.: US 7,143,859 B2
(45) Date of Patent: Dec. 5, 2006

(54) CONSTRUCTION MACHINERY

(75) Inventor: Naritoshi Ohtsukasa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 240 days.

(21) Appl. No.: 10/658,743

(22) Filed: Sep. 10, 2003

(65) Prior Publication Data

US 2004/0222000 A1  Nov. 11, 2004

(30) Foreign Application Priority Data

Sep. 11, 2002  (JP) .............................. 2002-265772

(51) Int. Cl.
    *B60K 17/356* (2006.01)
(52) U.S. Cl. ..................... 180/307; 60/431; 60/417
(58) Field of Classification Search ............... 180/65.2, 180/307, 53.8; 60/413, 414, 417, 420, 431; 37/348, 414
    See application file for complete search history.

(56) References Cited

U.S. PATENT DOCUMENTS

| | | | |
|---|---|---|---|
| 5,890,470 A * | 4/1999 | Woon et al. ................. | 123/350 |
| 6,666,022 B1 * | 12/2003 | Yoshimatsu et al. ......... | 60/413 |
| 6,820,356 B1 * | 11/2004 | Naruse et al. ................ | 37/348 |
| 6,851,207 B1 * | 2/2005 | Yoshimatsu .................. | 37/348 |
| 2002/0125052 A1 * | 9/2002 | Naruse et al. .............. | 180/53.8 |
| 2003/0132729 A1 * | 7/2003 | Yoshimatsu .................. | 320/104 |
| 2004/0148817 A1 * | 8/2004 | Kagoshima et al. .......... | 37/348 |
| 2005/0001606 A1 * | 1/2005 | Kagoshima .................. | 323/371 |
| 2005/0036894 A1 * | 2/2005 | Oguri ......................... | 417/212 |

FOREIGN PATENT DOCUMENTS

| | | | |
|---|---|---|---|
| JP | 60-30430 | * | 2/1985 |
| JP | 5-48501 | | 6/1993 |

* cited by examiner

*Primary Examiner*—Jeff Restifo
(74) *Attorney, Agent, or Firm*—Armstrong, Kratz, Quintos, Hanson & Brooks, LLP

(57) ABSTRACT

Construction machinery which is capable of improving fuel efficiency of the engine and also capable of effectively utilizing surplus energy in a light-load mode. The construction machinery includes an engine, a hydraulic pump driven by the engine, and actuators driven by oil pressure supplied from the hydraulic pump. In the light-load mode where the engine torque at the intersection point of an iso-horsepower curve of the necessary horsepower and a governor characteristic curve of the engine is smaller than that of a rated output point of the engine, the number of revolutions of the engine is reduced while the engine torque is increased with respect to the intersection point, and the horsepower is made to exceed the iso-horsepower curve. With surplus torque generated therefrom, a power generator is operated so as to generate electric power, which is stored in a power accumulation apparatus.

4 Claims, 5 Drawing Sheets

CONSTRUCTION MACHINERY

BACKGROUND OF THE INVENTION

1. Field of the Invention

The present invention relates to construction machinery such as a hydraulic shovel.

2. Description of the Related Art

Conventional construction machinery is mainly of a hydraulic driving type. In a hydraulic shovel, for example, hydraulic actuators (hydraulic cylinder, hydraulic motor) allow a working machine to drive, a revolving superstructure to turn, and a lower traveling structure to travel. In the shovel, pressure oil is discharged from a hydraulic pump driven by the engine, and the pressure oil supplied to these hydraulic actuators is controlled, so that works are performed.

Works of an hydraulic shovel do not always need to exhibit 100% of the capacity with reference to the capacity of the engine. Instead, there are many works which only need to exhibit 90% or 80% of the capacity. That is to say, as shown in the engine torque characteristic diagram shown in FIG. 4, there set working modes such as a point PS showing a "usual-load mode" for performing works with usual load, and a point PL showing a "light-load mode" for performing works with light load, with reference to a point PH showing a "100% load mode" for performing load works with 100% output. At each of the points PH, PS and PL, an iso-horsepower control is performed so as to match the driving torque of the hydraulic pump to the output torque of the engine (discharge amount of the hydraulic pump is controlled according to PQ curve (iso-horsepower curve) so as to gain the output torque of the matching point), to thereby efficiently utilize the engine output and improve the fuel consumption. Note that the driving torque of the hydraulic pump means a torque which is requested from the hydraulic pump to the engine in order to drive hydraulic actuators.

A hydraulic shovel mounts an engine having an output which coincides with the largest necessary horsepower in a case that a vehicle performs a work, that is, such an engine that the rating output point PH of the engine torque curve coincides with the largest necessary horsepower curve L shown in FIG. 4. Recently, there are demands for miniaturizing the engine so as to increase fuel efficiency. In this case, when the engine is simply miniaturized, there may arise a case that the necessary driving torque is not achieved in the hydraulic pump even when the capacity of the engine is 100% used. Therefore, restrictions (provisions) are provided with respect to the miniaturization of engines so that the miniaturization has not aggressively taken place.

In order to solve these problems, a hybrid-type construction machinery including, for example, an engine, a power generator driven by the engine, a battery which charges electric power generated by the power generator, and an electric motor driven by the electric power of the battery, has been proposed conventionally (See, for example, the Japanese Utility Model Laid-open No. 5-48501).

FIG. 5 shows the relation between the number of revolutions of the engine and the engine torque. In FIG. 5, curves 1 to 7 show iso fuel-consumption efficiency (iso fuel-consumption rate), respectively, in which the fuel consumption efficiency is improved from the curve 1 to the curve 7. Here, the fuel-consumption efficiency means a necessary fuel weight per horsepower (g/HP). A curve 50 shows the limit curve of the controllable range of a governor controlling the engine speed. The range outside of the curve 50 shown by the virtual curves does not exist actually.

Now, the operational control of the hybrid-type construction machinery will be explained referring to FIG. 5. In the case of a light-load mode (light-load state) where the arm, the bucket and the like oscillate, the number of revolutions of the engine and the engine torque are small, shown, for example, as the point A (torque T1). In this case, the fuel-consumption efficiency is represented as the curve 1. In the light-load mode, the engine torque is increased while the number of revolutions of the engine remains as it is, so as to generate, for example, the torque T2 equivalent to the point B on the curve 2. The difference between the T1 and T2 is used as the surplus torque for generating power in the power generator, to thereby charge the battery.

In the case of a high-load mode (high-load state) where the necessary driving torque in the hydraulic pump is larger than that of the rating output point of the engine, that is, in the case that the driving torque needs the torque T4 at the point D, it is accommodated by adding the torque (T4−T3) to the torque T3 by the engine at the point C. The fuel-consumption efficiency of this case exhibits the highest fuel-consumption rate in the curve 7.

In the conventional light-load mode described above, although the fuel-consumption efficiency is slightly improved, it is far from the best point. That is to say, it may not be the operation in which the fuel-consumption efficiency is considered. Further, in the high-load mode, the engine does not run at a point approximate to the rating output point where nearly 100% capacity of the engine is to be exhibited. Therefore, in order to output the necessary driving torque, a larger torque should be added (assisting torque). Consequently, the electric motor needs larger output, which may result in that the torque is not achieved. Moreover, the output of the engine has not been effectively utilized.

SUMMARY OF THE INVENTION

The present invention has been developed to solve the problems in the conventional technique described above. It is therefore an object of the present invention to provide construction machinery which is capable of improving fuel-consumption rate of the engine in the light-load mode (a mode where the engine torque at the intersection point of the iso-horsepower curve of the necessary horsepower and the governor characteristic curve of the engine 1 is smaller than that of the rating output point of the engine 1) and also capable of utilizing the surplus energy.

Construction machinery according to the present invention comprises: an engine 1; a hydraulic pump 4 driven by the engine 1; and actuators 6 driven by pressure oil supplied from the hydraulic pump 4. In the case of a load mode where the engine torque at the intersection point of the iso-horsepower curve of the necessary horsepower and the governor characteristic curve of the engine 1 is smaller than that of the rating output point of the engine 1, the number of revolutions of the engine is reduced and the engine torque is increased with reference to the intersection point, and the engine is allowed to run with a horsepower that exceeds the iso-horsepower curve. With the surplus torque generated therefrom, a power generator is operated so as to generate an electric power, and the generated electric power is accumulated in a power accumulation apparatus 12.

According to the construction machinery of this invention, in the load mode where the engine torque at the intersection point of the iso-horsepower curve of the necessary horsepower and the governor characteristic curve of the engine 1 is smaller than that of the rating output point of the engine 1, the number of revolutions of the engine is reduced, the engine torque is increased, and the engine is allowed to run with a horsepower exceeding the iso-horsepower curve. Therefore, the fuel consumption rate may usually be improved. This may provide excellent fuel consumption rate, so that the cost reduction can be achieved. Further, the power generator 11 is operated so as to generate electric power by the surplus torque, so that the generated electric power is accumulated in the power accumulation apparatus 12. With this structure, the surplus torque is effectively utilized and the machinery is highly economical.

Construction machinery of this invention has a characteristic that, in the case of a load mode where the iso-horsepower curve of the necessary horsepower and the governor characteristic curve of the engine 1 do not generate an intersection point, the engine 1 is driven at a point approximate to the rating output point while the power generator functioning as an electric motor is operated by the power accumulation apparatus 12, so that assist running for assisting the shortage is performed.

According to the construction machinery of this invention, in the load mode where the iso-horsepower curve of the necessary horsepower and the governor characteristic curve of the engine 1 do not generate an intersection point, the engine 1 is driven at a point approximate to the rating output point while the power generator functioning as an electric motor is operated. Therefore, the necessary driving torque can be generated in the hydraulic pump 4, so that works corresponding to this load (for example, an excavation when the construction machinery is an hydraulic shovel) can be performed. Further, since the engine runs at a point approximate to the rating output point, shortage of the torque with reference to the necessary torque is small. Thus, the power generator 11 functioning as an electric motor and the power accumulation apparatus 12 can be miniaturized. Moreover, the operation of the power generator 11 can surely generate the torque for the shortage, so that the works corresponding to the high-load can be surely performed. Further, a driving torque necessary for the hydraulic pump 4 is not generated by the engine 1 alone in the case of the high-load mode. Therefore, it is possible to miniaturize the engine 1 and to achieve the reduced fuel consumption rate.

Construction machinery of this invention has a characteristic that the power accumulation is performed with the number of revolutions by which the power generator is to be in the high efficiency state.

In the construction machinery of this invention, the power accumulation is performed with the number of revolutions by which the power generator is to be in the high efficiency state, so that the power accumulation can be performed efficiently.

Construction machinery of this invention has a characteristic that assist running is performed with the number of revolutions by which the power generator functioning as an electric motor is to be in the high efficiency state.

In the construction machinery of this invention, the assist running is performed with the number of revolutions by which the power generator functioning as an electric motor is to be in the high efficiency state, so that the assisting torque can be generated efficiently.

PREFFERD EMBODIMENT OF THE INVENTION

Figure 3:
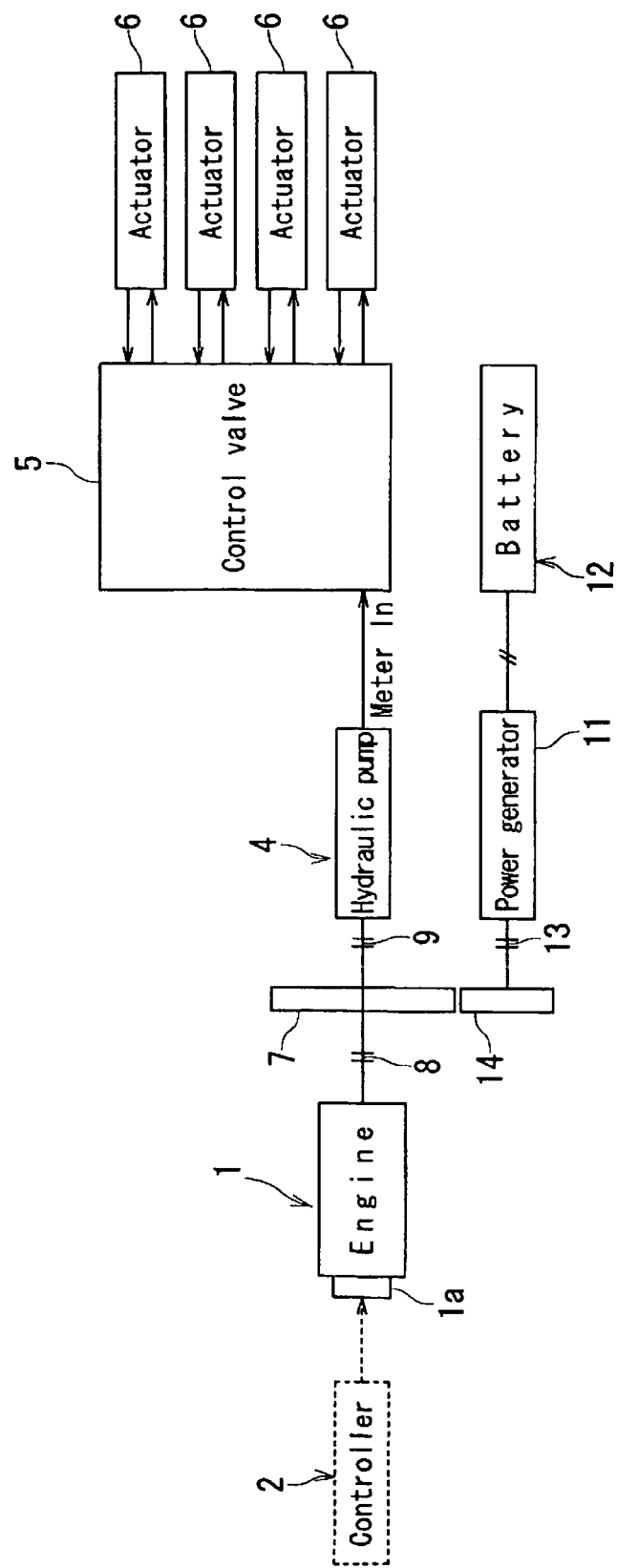
FIG. 3 is a schematic block diagram for explaining a driving system of the construction machinery.
Figure 4:
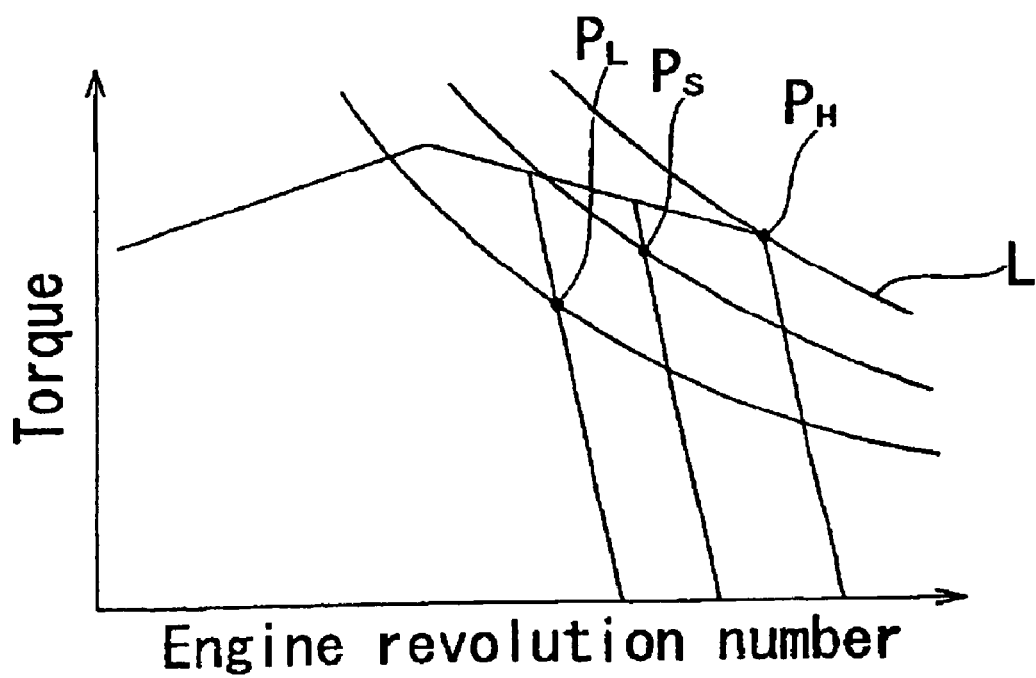
FIG. 4 is an engine torque characteristic diagram for explaining a working state of a conventional construction machinery.
Figure 5:
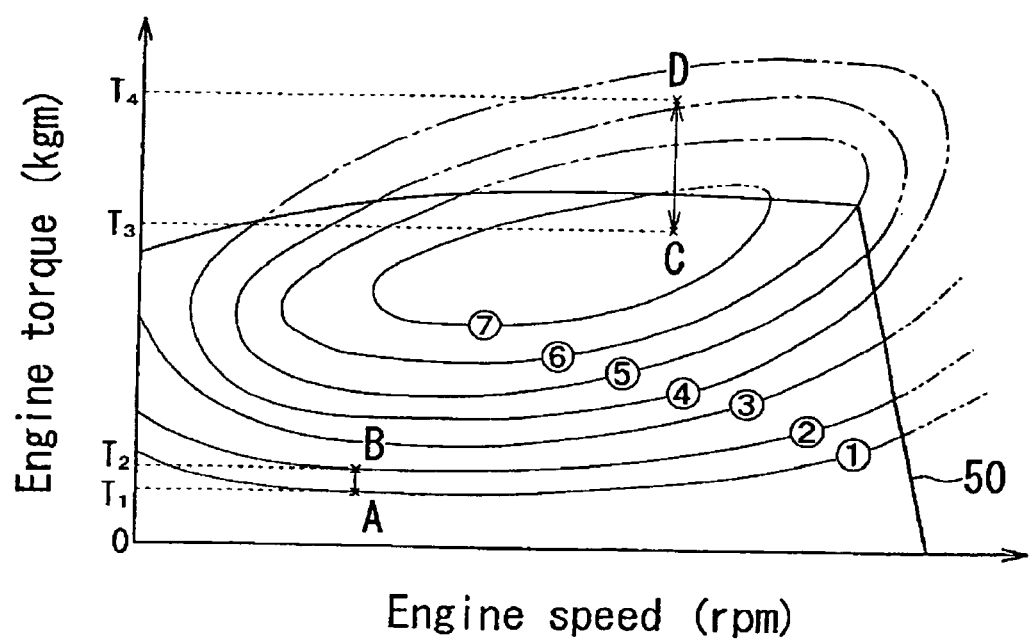
FIG. 5 is an engine torque characteristic diagram of a conventional hybrid-type construction machinery.

Next, a specific embodiment of construction machinery according to the present invention will be explained in detail with reference to the drawings. FIG. 3 is a schematic block diagram showing the driving system of construction machinery according to an embodiment of the present invention. In FIG. 3, the reference numeral 1 denotes the engine. The engine 1 is so configured that its number of revolutions is adjusted by a governor 1a, which receives a governor instruction from a controller 2. The numeral 4 denotes a hydraulic pump of the variable capacity type driven by the engine 1. Pressure oil discharged form the hydraulic pump 4 is supplied to various actuators 6 via a control valve 5. The actuators 6 may be a boom cylinder, an arm cylinder, a bucket cylinder, a right-side traveling motor, a left-side traveling motor, a turning motor and the like. The tilting angle of a swash plate of the hydraulic pump 4 is driven by a means for driving swash plate angle, not shown, which is driven by a load acting on each of the actuators 6 and an instruction from the controller 2, to thereby control the discharge amount of the pressure oil from the hydraulic pump 4.

Between the engine 1 and the hydraulic pump 4, an output gear 7 (an interlock means) is provided. Further, to a rotational shaft sandwiching the output gear 7 in between, that is, an output shaft of the engine 1 and an input shaft of the hydraulic pump 4, a first clutch 8 and a second clutch 9 are provided in between, respectively, each of which is a disconnecting means for disconnecting transmission of the power from the engine 1 to the hydraulic pump 4.

The construction machinery also includes a power generator 11, to which a power accumulation apparatus 12 (in this case, a battery) for accumulating (charging) the electric power generated by the power generator is connected. Further, a gear 14 (an interlock means) is linked to the input shaft of the power generator 11 via a third clutch 13. By letting the gear 14 mesh the output gear 7 of the engine 1, the power generator 11 and the hydraulic pump 4 are configured so as to be able to interlock. The power generator 11 also has a function as an electric motor which motor-operates using the electric power charged in the battery 12. That is to say, the power generator 11 has functions of a motor operation (a function as an electric motor) for assisting driving of the hydraulic pump 4, and a power generating operation (a function as a power generator) for generating power, the driving source of which is the engine 1. Further, an accelerator/decelerator (not shown) connects to the power generator 11 so that the number of revolutions can be changed intentionally. Note that the machinery is configured in such a manner that switching of a function as an electric motor and a function of a power generator is performed according to an instruction from a controller for the power generator/electric motor, which is not shown. As for the battery 12, a secondary battery such as a lithium ion battery, for example, is used.

According to the aforementioned construction machinery, when a start signal is input into the controller 2, the controller 2 transmits a governor instruction of the rating revolution number to the governor 1a to thereby start the engine 1. Thereby, the hydraulic pump 4 is driven and each actuator 6 operates.

Figure 1:
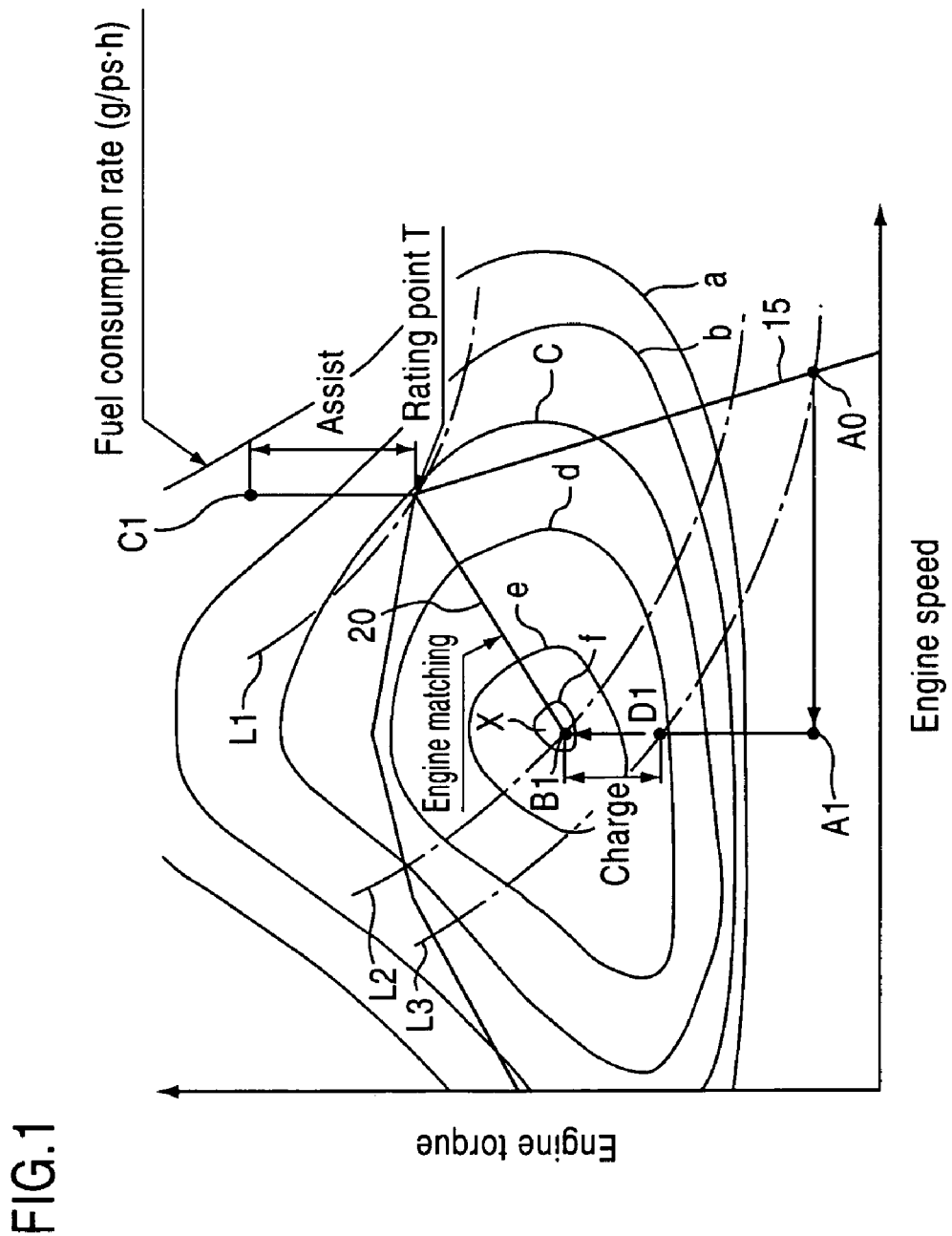
FIG. 1 is an engine torque characteristic diagram of construction machinery according to an embodiment of the present invention.

In a case that coordinates are drawn in which the engine speed (number of revolutions) is laid on the abscissa axis and the engine torque is laid on the ordinate axis, as shown in FIG. 1, curves representing the iso-fuel consumption rate are shown as curves a, b, c, d, e, for the like, and the iso-horsepower curves we shown as curves L1, L2, L3 or the like. The iso-fuel consumption rate curves are improved as moving from the curve a to the curve f. That is, the best point X exists in the curve f. In this case, the iso-fuel consumption rate means an amount of fuel consumed per unit output within a unit time, as shown as g/PS·h. Further, in FIG. 1, the numeral 15 denotes a governor characteristic curve showing the limit of the controllable range of a governor controlling the engine speed. The outside of the governor characteristic curve 15 does not exist actually.

In the case of, for example, the light-load mode in which the arm, the bucket or the like oscillate, that is, a case that only 80% of the capacity with reference to the horsepower capacity of the engine 1 are needed and the iso-horsepower curve of the necessary horsepower is the curve L3, while the torque at the intersection point of the governor characteristic curve 15 and the iso-horsepower curve L3 (indicated at paint A0) is less than the torque at the rated output point of the engine 1, the number of revolutions of the engine is reduced, from that at A0 to that at A1, than the intersection point and the driving torque are increased, and the horsepower is made to exceed the iso-horsepower curve L3. In this way, the fuel consumption efficiency of the engine 1 can be increased. In this case, the torque is increased from that at the point A1 to that at the point B1 which is approximate to the best fuel consumption efficiency point X. That is, the torque at B1, which is greater than the necessary driving torque at D1 on the iso-horsepower curve L3, is generated. The difference between the torque at the point B1 and the point D1 is used as the surplus torque so as to operate the power generator 11. Thereby, the battery 12 is charged.

In the range where the torque at the intersection point of the iso-horsepower curve L of the necessary horsepower and the governor characteristic curve 15 is smaller than that of the rating output point T, as described above, the surplus torque is charged in the battery in such a manner that the number of revolutions and torque which form the matching curve 20 in FIG. 1 are used as the horsepower. Consequently, it is possible to improve fuel consumption by effectively utilizing the engine output and also possible to effectively utilize the surplus torque. It should be noted that a driving point of the engine 1 in the state of the surplus torque being not collected, may be the intersection point of the governor characteristic curve 15 and the iso-horsepower curve L3, or another point on the iso-horsepower curve L3, for example, the point D1, considering the fuel consumption rate.

Further, in the case where the iso-horsepower curve of the necessary horsepower and the governor characteristic curve 15 do not generate an intersection point, that is, in the case of the high-load mode at the time of excavation or the like and the necessary driving torque in the hydraulic pump 4 is the point C1 in FIG. 1 which is larger than the rating output point T, the torque is insufficient even when the engine 1 starts at the rating output point T, so that the hydraulic actuators 6 may not be driven surely. Therefore, in such a high-load mode, the power generator 11 is allowed to function as an electric motor, so as to perform assist driving for assisting the shortage (C1-T). With this assistance, the hydraulic actuators 6 can be surely driven.

Figure 2:
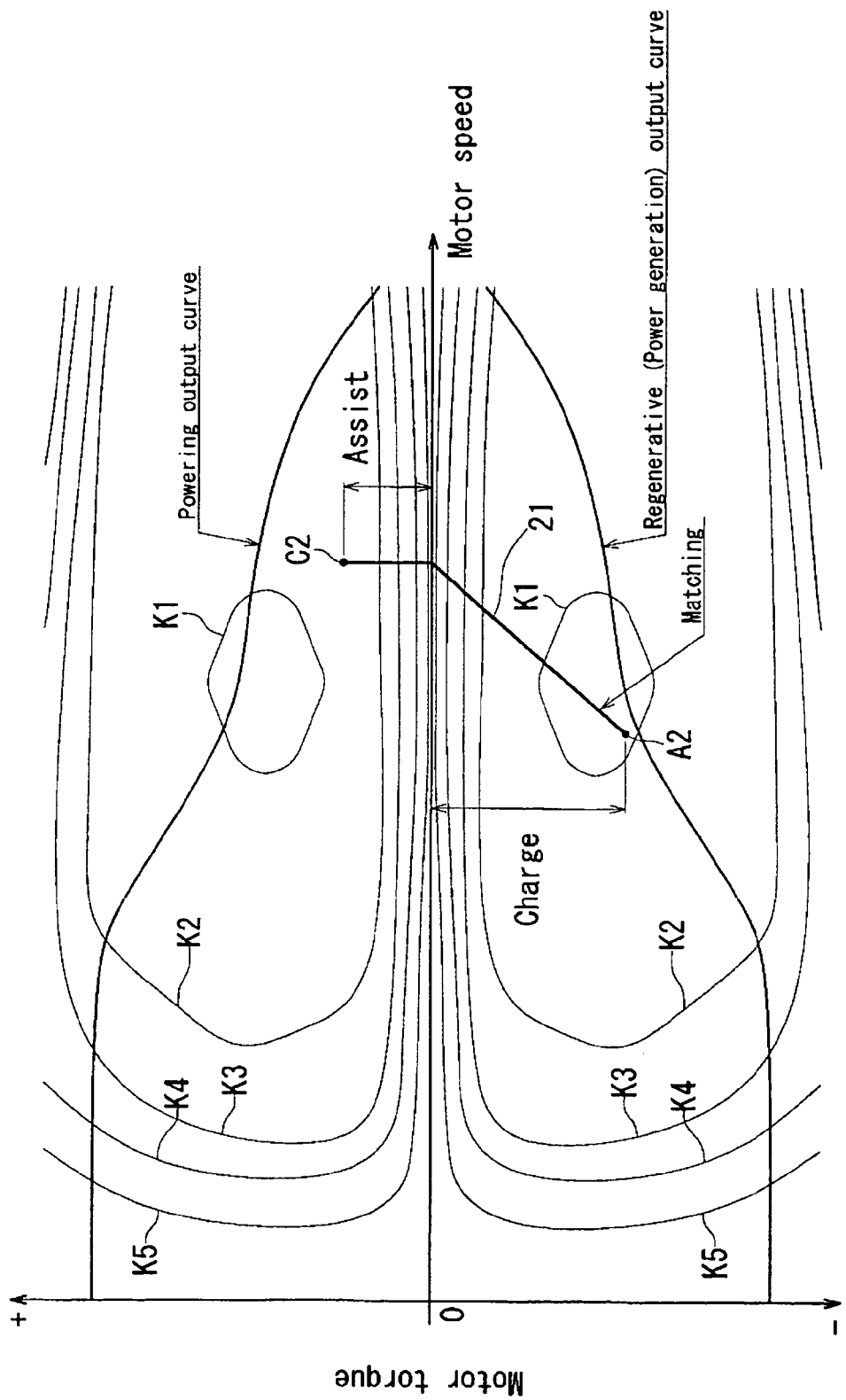
FIG. 2 is a graph showing the efficiency of a power generator of the construction machinery.

The efficiency of the power generator 11 (motor efficiency) is shown as curves K1 to K5 or the like in FIG. 2. In this case, the revolution speed (number of rotations) is laid on the abscissa axis, the torque as the electric motor is laid in the positive direction of the ordinate axis, and the torque as the power generator is laid in the negative direction of the ordinate axis. The efficiency is increased as moving from the curve K5 to the curve K1. In the case that the power generator 11 is allowed to function as a power generator, that is, in the state of A1 shown in FIG. 1 in the light-load mode, the number of revolutions of the power generator 11 is adjusted by an accelerator/decelerator, which is not shown, while the motor torque (torque of the power generator 11) is increased, so as to be in the range of the curve K1 of the high efficiency as A2 shown in FIG. 2. That is, the number of revolutions of the power generator 11 is changed according to the horsepower collected so as to control the number of revolutions and the torque to form the matching curve 21 in FIG. 2. Consequently, the power generator 11 operates in the high efficiency state when the power generator 11 functions as a power generator. Note that the point A2 in FIG. 2 represents the maximum charge amount.

In the case that the power generator 11 functions as an electric motor, when, in the state of the high-load mode, the necessary driving torque is the point C1 in FIG. 1, the number of revolutions of the power generator 11 is kept at the predetermined value by the accelerator/decelerator, while the motor torque (torque of the power generator 11) is increased so as to be in the range of the curve K2, as the point C2 shown in FIG. 2. Although the number of revolutions of the power generator 11 is set as approximate constant in the present embodiment, as aforementioned, the number of revolutions of the power generator 11 may be changed depending on the torque. That is, shown as the matching curve 21 at the time of charging, the power generator 11 may operate in the high efficiency state by assuming the matching curve to be in the curve K1 showing the high efficiency, and controlling the number of revolutions and the torque so as to form the matching curve according to the output horsepower.

In the aforementioned construction machinery, in the case of the light-load mode (a mode in which the engine torque at the intersection point of the iso-horsepower curve of the necessary horsepower and the governor characteristic curve of the engine 1 is smaller than that of the rating output point of the engine 1), the excellent fuel consumption rate can be exhibited by operating the engine for increasing the fuel consumption efficiency, so that a sharp cost reduction can be achieved. Further, the construction machinery operates the power generator so as to generate electric power by the surplus torque generated, and charges the generated electric power in the battery 12. This can effectively utilize the surplus torque and is highly economical.

Further, in the case of the high-load mode (a mode in which the iso-horsepower curve of the necessary horsepower and the governor characteristic curve of the engine 1 do not generate an intersection point), the engine 1 is driven at a point approximate to the rating output point and the power generator functioning as an electric motor is operated. Therefore, a torque necessary for the driving torque of the hydraulic pump 4 can be generated, so that works corresponding to the high load (for example, an excavation when the construction machinery is a hydraulic shovel) can be performed. Further, since the engine 1 runs at a point approximate to the rating output point, a stable operation (driving) can be achieved as the engine 1, and the shortage of the torque with reference to the necessary torque is a little. Moreover, the operation of the power generator functioning as an electric motor is surely capable of generating the torque for the shortage. Accordingly, the works corresponding to the high-load can be performed safely and surely.

Further, since the operation of the power operator functioning as an electric motor is performed by charging according to the surplus torque at the time of the light-load mode, this construction machinery can run efficiently. Moreover, the charging is performed with the number of revolutions by which the power generator 11 is to be in the high efficiency state. Therefore, efficient charging can be achieved. Furthermore, the assist driving is performed with the number of revolutions by which the power generator 11 functioning as an electric motor is to be in the high efficiency state. Therefore, the assisting torque can be generated efficiently.

Although a specific embodiment of the construction machinery according to the present invention has been explained above, the present invention is not limited to the aforementioned embodiment and various changes and modifications may be made therein without departing from the scope of the invention. For example, in the aforementioned embodiment, the electric power charged in the battery 12 is used for operating the power generator functioning as an electric motor so as to control to assist the shortage in the necessary driving torque in the hydraulic pump. However, the battery 12 may be configured to be used for operating other controlling systems. Further, as for the power accumulation apparatus 12, a capacitor (condenser) may be used substituting with the battery. Note that the necessary driving torque depends on the working state or the like. Therefore, the surplus torque, assisting amount and the like are not limited to that shown in FIG. 1.

What is claimed is:

1. Construction machinery comprising:
   an engine.
   a hydraulic pump driven by the engine; and
   an actuator driven by oil pressure supplied from the hydraulic pump; wherein
   in a case of a load mode where an engine torque at an intersection point of an iso-horsepower curve of a necessary horsepower and a governor characteristic curve of the engine is less than that of a rated output point of the engine, the number of revolutions of the engine is reduced and the engine torque is increased with reference to the intersection point, and the engine is allowed to run with a horsepower exceeding the iso-horsepower, and with use of a surplus torque generated therefrom, a power generator is operated so as to generate an electric power, which is accumulated in a power accumulation apparatus.

2. The construction machinery as claimed in claim 1, wherein
   in a case of a load mode where the iso-horsepower curve of the necessary horsepower and the governor characteristic curve of the engine do not generate an intersection point, the engine is driven at a point approximate to the rated output point while the power generator functioning as an electric motor is operated by the power accumulation apparatus so that assist running for providing a torque shortage is performed.

3. The construction machinery as claimed in claim 1 or 2, wherein
   the power accumulation is performed by the power generator at the number of revolutions at which the power generator is in a high efficiency state.

4. The construction machinery as claimed in claim 2, wherein
   assist running is performed by the power generator at the number of revolutions at which the power generator functioning as an electric motor is in a high efficiency state.

* * * * *